(12) United States Patent
Parker

(10) Patent No.: US 9,048,656 B2
(45) Date of Patent: Jun. 2, 2015

(54) CIRCUIT INTERRUPTER INCLUDING SUPERVISORY FUNCTION FOR PROTECTIVE FUNCTION AND HARDWARE CIRCUIT REPETITIVE TEST FUNCTION

(71) Applicant: EATON CORPORATION, Cleveland, OH (US)

(72) Inventor: Kevin L. Parker, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 355 days.

(21) Appl. No.: 13/711,830

(22) Filed: Dec. 12, 2012

(65) Prior Publication Data

US 2014/0160603 A1    Jun. 12, 2014

(51) Int. Cl.
*H02H 3/00* (2006.01)
*H02H 9/08* (2006.01)
*H02H 3/04* (2006.01)
*H02H 1/00* (2006.01)
*H01H 71/04* (2006.01)

(52) U.S. Cl.
CPC .............. *H02H 3/044* (2013.01); *H02H 1/0015* (2013.01); *H02H 1/0092* (2013.01); *H01H 2071/044* (2013.01)

(58) Field of Classification Search
CPC ...................................................... H02H 3/335
USPC .................................................. 361/42–50, 1
See application file for complete search history.

(56) References Cited

U.S. PATENT DOCUMENTS

| | | | |
|---|---|---|---|
| 6,421,214 B1 * | 7/2002 | Packard et al. ................... 361/7 |
| 7,345,489 B2 * | 3/2008 | DeHaven ....................... 324/555 |
| 7,633,727 B2 | 12/2009 | Zhou et al. |
| 7,633,736 B2 * | 12/2009 | Domitrovich et al. ......... 361/115 |
| 8,023,235 B2 * | 9/2011 | Bilac et al. ....................... 361/42 |
| 8,058,751 B2 | 11/2011 | Parker |
| 8,526,144 B2 * | 9/2013 | Kevelos et al. .................. 361/42 |
| 2005/0237680 A1 * | 10/2005 | Egner ............................... 361/42 |
| 2008/0204950 A1 * | 8/2008 | Zhou et al. ....................... 361/42 |

(Continued)

FOREIGN PATENT DOCUMENTS

EP    2 099 110 A1    9/2009

OTHER PUBLICATIONS

European Patent Office, "Invitation and partial International Search", Apr. 15, 2014, 7 pp.

*Primary Examiner* — Thienvu Tran
*Assistant Examiner* — Christopher Clark
(74) *Attorney, Agent, or Firm* — Eckert Seamans Cherin & Mellott, LLC; Kirk D. Houser; Nathaniel C. Wilks

(57) ABSTRACT

A circuit interrupter for a power circuit includes separable contacts, an operating mechanism structured to open and close the separable contacts, and a trip circuit cooperating with the operating mechanism to trip open the separable contacts. The trip circuit includes a number of hardware circuits having a processor with a number of routines. The routines provide a number of protective functions structured to detect a number of faults of the power circuit, a number of repetitive test functions for the number of hardware circuits, and a supervisory function cooperating with the number of repetitive test functions. The supervisory function is structured to prevent availability of protection by the number of protective functions from falling below a predetermined threshold as a result of a plurality of intermittent error conditions of the number of hardware circuits.

18 Claims, 13 Drawing Sheets

(56) References Cited

U.S. PATENT DOCUMENTS

| | | | |
|---|---|---|---|
| 2009/0251148 A1* | 10/2009 | Finlay et al. | 324/424 |
| 2010/0295568 A1* | 11/2010 | Ostrovsky et al. | 324/750.3 |
| 2011/0216452 A1 | 9/2011 | Haines et al. | |
| 2012/0250193 A1* | 10/2012 | Kevelos et al. | 361/45 |

* cited by examiner

CIRCUIT INTERRUPTER INCLUDING SUPERVISORY FUNCTION FOR PROTECTIVE FUNCTION AND HARDWARE CIRCUIT REPETITIVE TEST FUNCTION

BACKGROUND

1. Field

The disclosed concept pertains generally to electrical switching apparatus and, more particularly, to circuit interrupters including a trip circuit.

2. Background Information

Ideally, circuit protection apparatus, such as circuit interrupters, are fully functional 100% of the time.

UL 943 discloses requirements for self-monitoring of electronics in ground fault circuit interrupter (GFCI) devices.

In arc fault circuit interrupter (AFCI) devices, various "automatic self-tests" are known. A digital processor conducts two kinds of hardware self-tests of surrounding analog circuitry. The first type of self-test occurs only when a user presses a test button of the AFCI. This is a "user-initiated" self-test, as is required by UL 1699. In a second type of self-test, the processor continuously checks a certain set of parameters to determine whether each is within expected limits. These are "continuous" self-tests, and in some sense these tests are required by UL 1998.

There is room for improvement in circuit interrupters.

SUMMARY

These needs and others are met by embodiments of the disclosed concept in which a processor of a trip circuit includes a number of routines to provide a number of protective functions to detect a number of faults of a power circuit, a number of repetitive test functions for a number of hardware circuits, and a supervisory function cooperating with the number of repetitive test functions and structured to prevent availability of protection by the number of protective functions from falling below a predetermined threshold as a result of a plurality of intermittent error conditions of the number of hardware circuits.

In accordance with one aspect of the disclosed concept, a circuit interrupter is for a power circuit. The circuit interrupter comprises: separable contacts; an operating mechanism structured to open and close the separable contacts; and a trip circuit cooperating with the operating mechanism to trip open the separable contacts, the trip circuit comprising a number of hardware circuits including a processor having a number of routines structured to provide: a number of protective functions structured to detect a number of faults of the power circuit, a number of repetitive test functions for the number of hardware circuits, and a supervisory function cooperating with the number of repetitive test functions, the supervisory function being structured to prevent availability of protection by the number of protective functions from falling below a predetermined threshold as a result of a plurality of intermittent error conditions of the number of hardware circuits.

The supervisory function may be executed once per each of a plurality of half-cycles of a line-to-neutral voltage of the power circuit, and be structured to determine if any one of the number of repetitive test functions detects an error condition during a current one of the half-cycles, set a timer equal to a predetermined timeout value, determine if the timer is greater than zero, decrement the timer and increment an accumulator, and determine if the accumulator is greater than a predetermined threshold value and responsively cause the trip circuit to cooperate with the operating mechanism to trip open the separable contacts.

The supervisory function may be further structured to employ a predetermined timeout value for a desired availability of the number of protective functions; and if actual availability of the number of protective functions falls below the desired availability for as long as a predetermined time period, then the supervisory function may be structured to cause the trip circuit to trip open the separable contacts.

In accordance with another aspect of the disclosed concept, an electronic trip unit is for a circuit breaker for a power circuit. The electronic trip unit comprises: a trip circuit structured to cooperate with an operating mechanism to trip open separable contacts, the trip circuit comprising a number of hardware circuits including a processor having a number of routines structured to provide: a number of protective functions structured to detect a number of faults of the power circuit, a number of repetitive test functions for the number of hardware circuits, and a supervisory function cooperating with the number of repetitive test functions, the supervisory function being structured to prevent availability of protection by the number of protective functions from falling below a predetermined threshold as a result of a plurality of intermittent error conditions of the number of hardware circuits.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
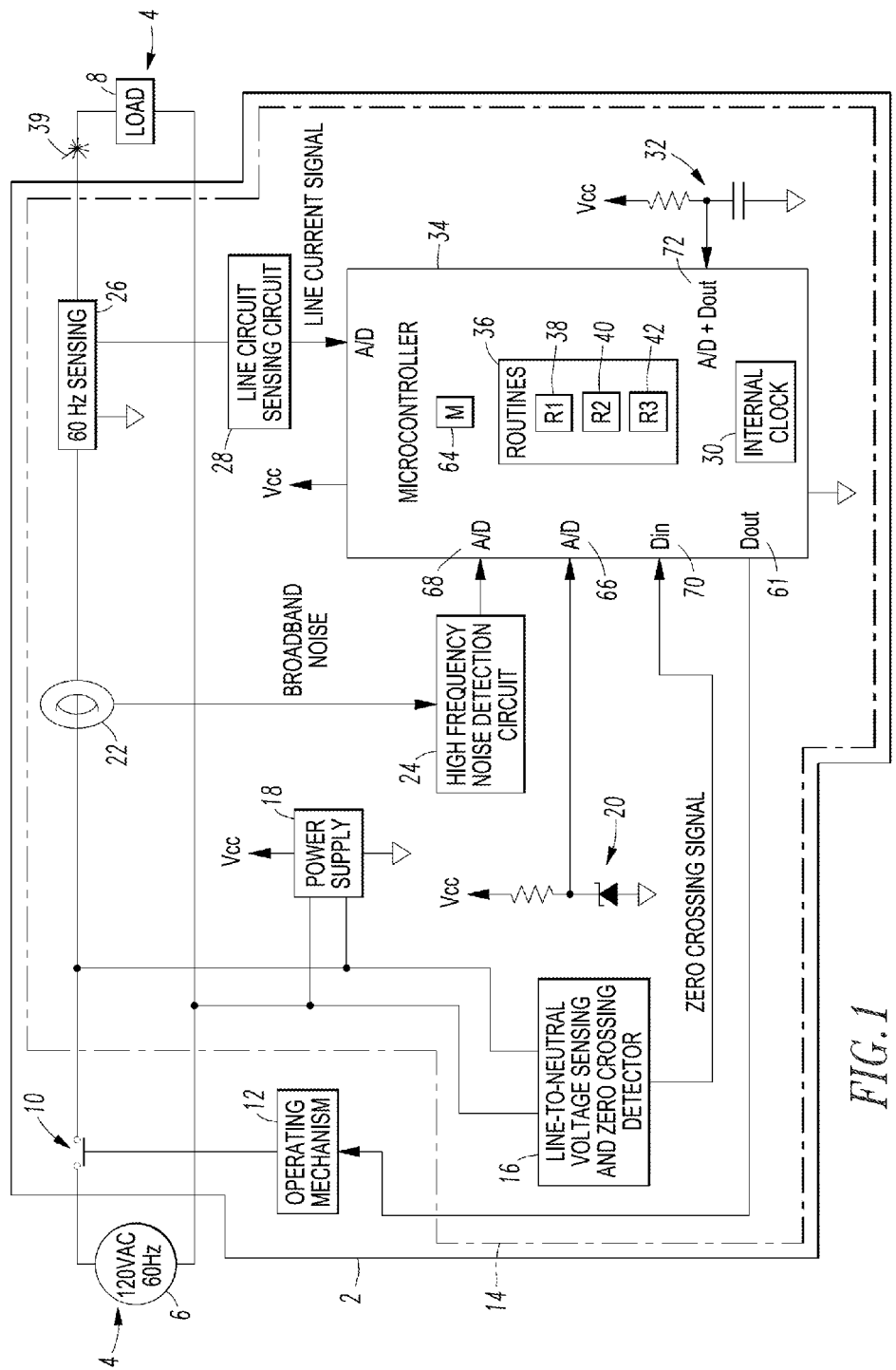
FIG. 1 is a block diagram in schematic form of a circuit interrupter in accordance with embodiments of the disclosed concept.

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with a single-pole arc fault circuit breaker, although the disclosed concept is applicable to a wide range of circuit interrupters having any number of poles, including, for example and without limitation, AFCIs, GFCIs, electronic trip units for relatively larger classes of circuit breakers, and a wide range of circuit protection devices.

The disclosed concept addresses a potential problem where, for example, an electronic hardware error condition occasionally occurs that interferes with the operation of a circuit interrupter. For example, an electronic hardware error condition might occur frequently enough to impair the protective functions of a circuit interrupter. The disclosed concept seeks to ensure that a circuit interrupter with an impaired operation is detected and removed from service (e.g., placed in a tripped condition).

It is believed that self-monitoring of electronics (e.g., in GFCIs) could expand toward "automatic self-tests" (e.g., in arc fault circuit interrupter (AFCI) devices). Hence, there is a need for new test and monitoring techniques.

One scenario that is sought to be avoided is for a protection function in an AFCI (e.g., a protection function intended to detect a power circuit fault, such as an arc fault) to trip the AFCI not because there is a power circuit fault, but instead because some part of the AFCI circuitry is out-of-tolerance or operating improperly. In some "nuisance trip" scenarios, the AFCI mistakes a normal load for some kind of power circuit fault. However, in this "nuisance trip" case, the AFCI instead mistakes a problem with the AFCI circuitry for some kind of power circuit fault.

In order to address this case, when a repetitive test function, such as a continuous hardware test, detects an out-of-tolerance condition, an associated error accumulator is incremented. If the out-of-tolerance condition persists indefinitely, then the accumulator will eventually exceed a trip threshold and the AFCI will trip. Also, when a continuous hardware test detects an out-of-tolerance condition, a number of protection functions that rely on data related to a number of corresponding hardware circuits are reset. In this manner, the AFCI is allowed to trip in response to a protection function only when the AFCI circuitry is operating properly for the entire duration of whatever power circuit fault event led to the trip. If the out-of-tolerance condition ceases before the AFCI trips, then the AFCI assumes that this condition is gone for good; hence, the associated error accumulator is reset to zero and the associated protection function is allowed to start operation.

While this approach works well, there is an additional issue to be addressed. If there is an intermittent hardware error condition that happens frequently enough that any associated protection function is continuously reset, but also not frequently enough for any associated continuous hardware self-test to trip, then this condition can be referred to as a "gray" state. In other words, an AFCI in a "gray" state condition does not trip in response to failed continuous hardware self-tests, but also does not provide any meaningful arc fault protection. In contrast, an AFCI that is functioning perfectly can considered to be operating in a "white" state, and an AFCI in which an uninterrupted error condition is advancing the device toward a trip due to a continuous stream of hardware self-test failures is considered to be operating in a "black" state.

Accordingly, there is a need for a supervisory function to ensure that a number of circuit interrupter protective functions provide a sufficient availability of protection (e.g., above a predetermined threshold) in view of a plurality of intermittent error conditions of a number of hardware circuits. This type of supervisory function can help to identify circuit interrupters with marginal operation, in order that they can be removed from a field installation, and otherwise to ensure a suitable level of protection for operational circuit interrupters.

Referring to FIG. 1, a circuit interrupter, such as an arc fault circuit breaker 2, is for a power circuit 4 including a power source 6 (e.g., without limitation, 120 VAC, 60 Hz, although any suitable power line voltage and frequency can be employed) and a load 8. Although an arc fault circuit breaker 2 is shown, the circuit interrupter can be a ground fault circuit interrupter, an arc fault circuit interrupter, or a wide range of other circuit interruption apparatus. The example circuit breaker 2 includes separable contacts 10, an operating mechanism 12 structured to open and close the separable contacts 10, and a trip circuit, such as an electronic trip unit 14, cooperating with the operating mechanism 12 to trip open the separable contacts 10. The trip circuit 14 includes a number of hardware circuits 16,18,20,22,24,26,28,30,32,34 including a processor, such as the example microcontroller 34, having a number of routines 36. As will be discussed, the number of routines 36 are structured to provide a number of protective functions (R1) 38 structured to detect a number of faults of the power circuit 4, a number of repetitive test functions (R2) 40 for the number of hardware circuits, and a supervisory function (R3) 42 cooperating with the number of repetitive test functions 40. The supervisory function 42 is structured to prevent availability of protection by the number of protective functions 38 from falling below a predetermined threshold as a result of a plurality of intermittent error conditions of the number of hardware circuits.

Each of the number of repetitive test functions 40 is structured to detect an out-of-tolerance condition of a corresponding one of the number of hardware circuits 16,18,20,22,24, 26,28,30,32,34 and responsively increment a corresponding error accumulator, and cause the trip circuit 14 to trip open the separable contacts 10 if the corresponding error accumulator exceeds a predetermined value. Otherwise, if the out-of-tolerance condition is no longer detected, then the corresponding error accumulator is reset.

As non-limiting examples, the hardware circuits include a line-to-neutral voltage sensing and zero crossing detector 16, a direct current power supply 18, a direct current voltage reference 20, a high frequency current sensor 22, a high frequency noise detection circuit 24, a line frequency current sensor 26 (e.g., a current sensor that senses current at or about the frequency of the power source 6), a line current sensing circuit 28, an internal clock 30 and a resistor-capacitor (R-C) circuit 32. As other non-limiting examples, one of the number of protective functions (R1) 38 detects an arc fault 39 operatively associated with the power circuit 4. If one of the number of repetitive test functions (R2) 40 detects an error condition with a corresponding number of the hardware circuits, then it resets the arc fault protective function 38.

Figure 2:
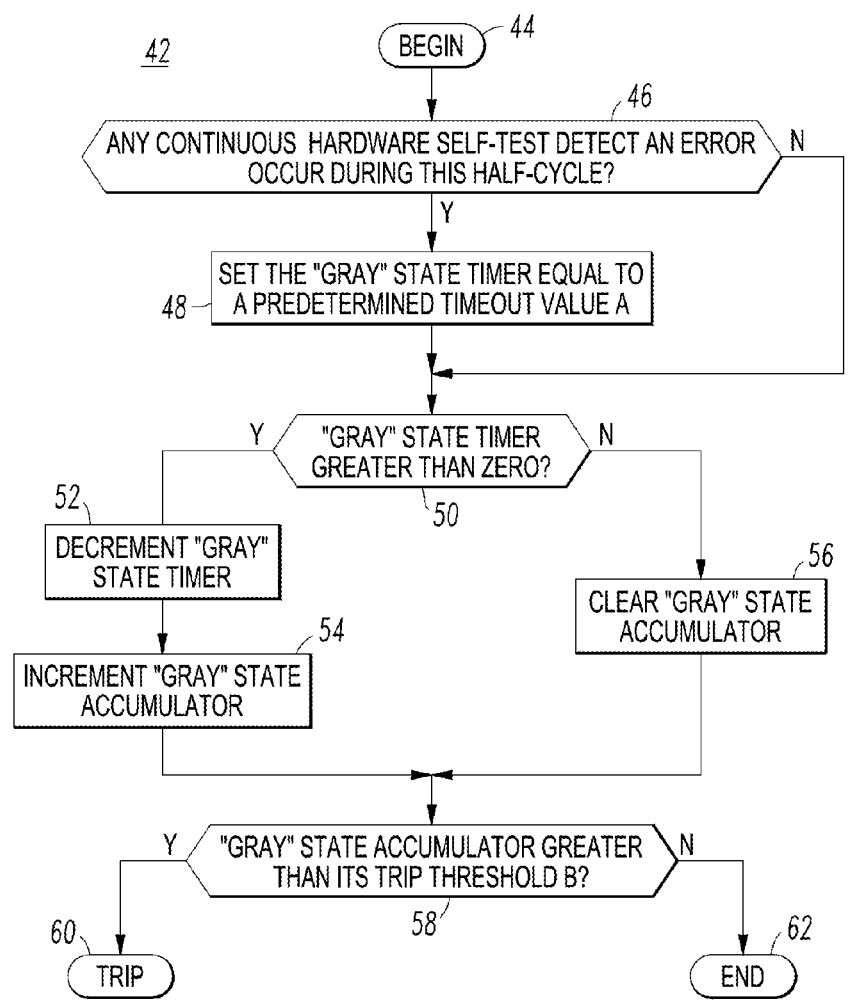
FIG. 2 is a flowchart of a supervisory monitoring function for the processor of the circuit interrupter trip circuit of FIG. 1.

FIG. 2 shows an example of the supervisory function 42 of FIG. 1. This supervisory monitoring function 42 trips the example circuit breaker 2 if there are relatively too many continuous self-test errors in relatively too short a period of time. The example function 42 begins at 44 and is executed, for example and without limitation, once per half-cycle of the line-to-neutral voltage as detected by the detector 16 of FIG. 1. At 46, it is determined if any continuous hardware self-test of the number of repetitive test functions 40 detected an error occurring during the present half-cycle. If so, then a "gray" state timer is set equal to a predetermined timeout value A at 48. Otherwise, or after 48, it is determined if the "gray" state timer is greater than zero at 50. If so, then the "gray" state timer is decremented at 52 and a "gray" state accumulator is incremented at 54. On the other hand, if the "gray" state timer is not greater than zero at 50, then the "gray" state accumulator is cleared at 56.

After 54 or 56, it is determined at 58 if the "gray" state accumulator is greater than a predetermined trip threshold B. If so, a trip is initiated at 60 by setting a digital output (Dout) 61 of the microcontroller 34. Otherwise, the function 42 ends at 62.

The disclosed supervisory function 42 for detecting a pattern of continuous hardware self-test failures is powerful, but computationally simple (e.g., it employs only a relatively few integer additions and subtractions per half-cycle) and consumes relatively minimal memory resources (e.g., two integers, the "gray" state timer, which is set at 48 and checked at 50, and the "gray" state accumulator of steps 54,56,58). The disclosed function 42 is well-suited for implementation in, for example, low-cost embedded processors.

The disclosed function 42 can set a desired target "availability" (e.g., based on the predetermined timeout value A) of the number of protective functions 38 and a predetermined time period (e.g., a "time window"; a predetermined trip threshold B). As will be explained, the "trip threshold" can be, for example, a count of half-cycles, which corresponds to a time duration. In Example 1, the "gray" state function 42 is set to trip the circuit breaker 2 if a period of 7200 half-cycles occurs during which there was at least one error in each and every 500 half-cycle interval during that 7200 half-cycle period. If the actual "availability" of the number of protective functions 38 falls below the desired target "availability" for a time duration equal to the "time window", then the trip circuit 14 causes a trip of the circuit breaker 2.

EXAMPLE 1

In this example, the circuit breaker 2 trips if the number of protective functions 38 are available less than 99.8% of the time during any 60-second period of the operational life of the circuit breaker 2. First, the example "availability" trip criterion is set:

availability=1−(net error rate)

(net error rate)=1−availability (gray state timeout value $A$)>=1/(net error rate)

(gray state timeout value $A$)>=1/(1−availability)

(gray state timeout value $A$)>=1/(1−0.998)=1/0.002

(gray state timeout value $A$)>=500

If the "gray state timeout value" A is not an integer, then it is simply rounded up to the next integer.

Another way to view "A" is as a kind of minimum mean number of half-cycles permitted between continuous self-test errors. That is, suppose A=500, then if on average at least one continuous self-test error occurs every 500 consecutive half-cycles for the duration of the time window, then the disclosed "gray" state function 42 will cause the circuit breaker 2 to trip.

Second, the "time window" B sets the minimum duration for which the error criteria must persist before the circuit breaker 2 trips. In this case, 60 seconds of 60 Hz half-cycles is 7,200 half-cycles.

EXAMPLE 2

The disclosed supervisory function 42 can be parameterized as follows. To decrease the probability of a "gray" state trip, the "required minimum availability" A is lowered, in order that more errors are tolerated, and the "time window" B is lengthened, in order that the error criteria needs to be met over a relatively longer duration.

Alternatively, to increase the probability of a "gray" state trip, the "required minimum availability" is increased, in order that fewer errors are tolerated, and the "time window" B is decreased, in order that the error criteria needs to be met over a relatively shorter duration.

EXAMPLE 3

Figure 3A:
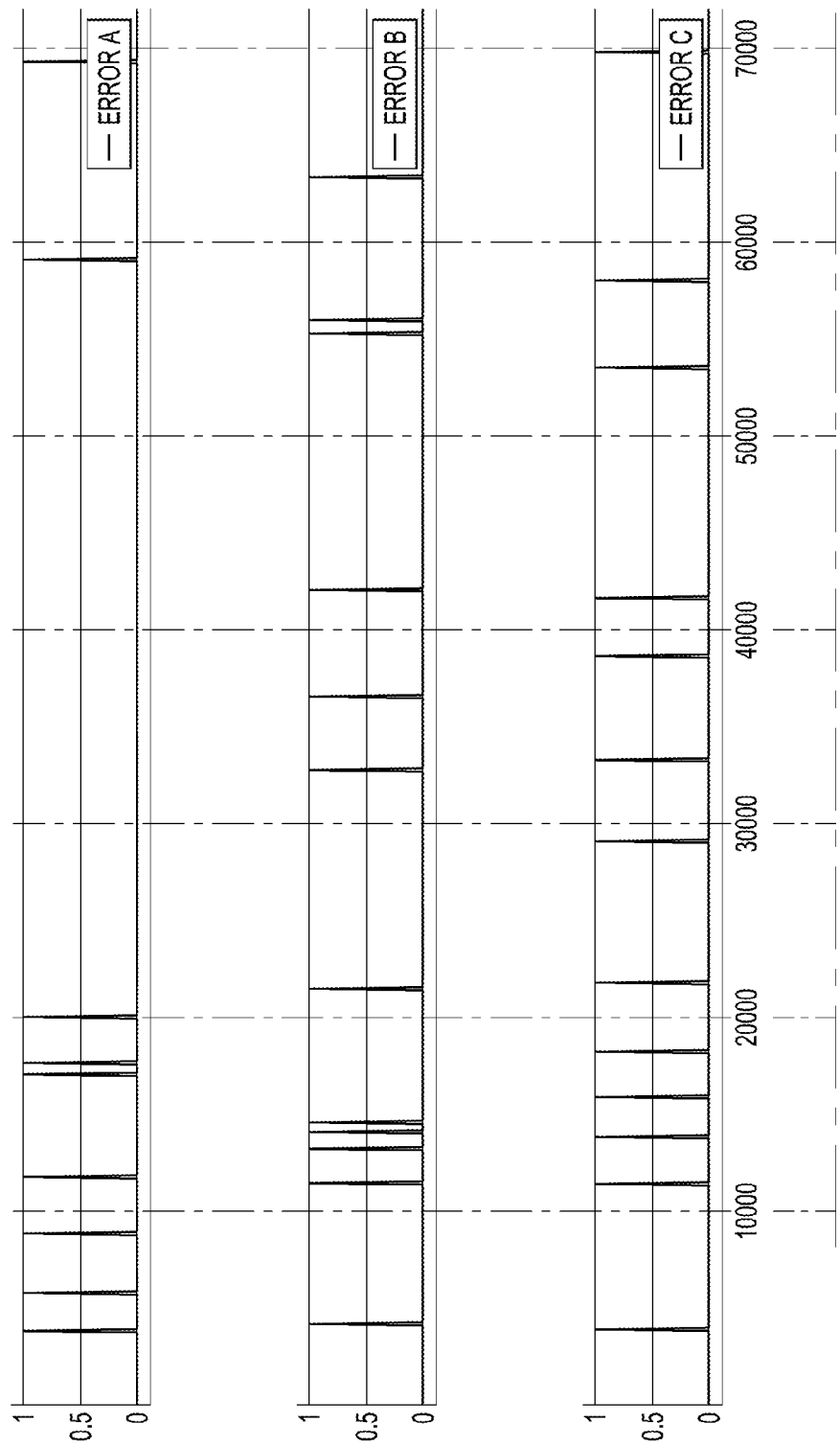
FIGS. 3A-3B form a plot of a "gray" state example with sporadic continuous hardware self-test errors in accordance with an embodiment of the disclosed concept.
Figure 3B:
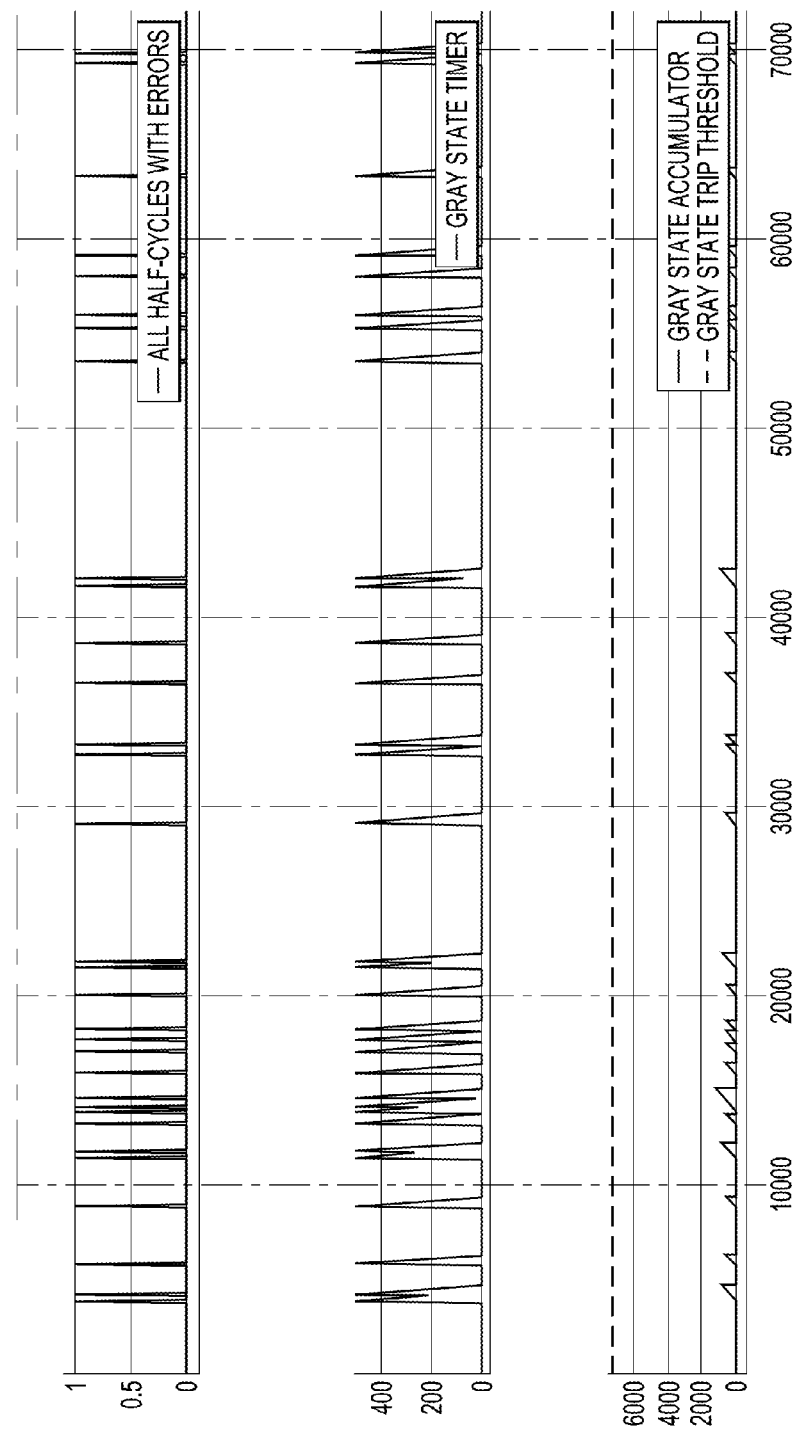

Referring to FIGS. 3A-3B, an example of "gray" state operation is simulated over a ten minute (i.e., 72,000 half-cycles at 60 Hz) interval. The "target availability" is set at 99.8% (A=500), and the "time window" is set at 10 seconds (B=7200). The simulation portrays an AFCI circuit breaker, such as circuit breaker 2, with three continuous hardware self-tests, each of which fails randomly as shown by "Error A", "Error B" and "Error C". When a trace is high, it indicates that a continuous hardware self-test error occurred for that continuous hardware self-test during that particular half-cycle. The trace "All half-cycles with errors" depicts a logical OR of all the errors that might occur in a given half-cycle. The "gray state timer" and the "gray state accumulator" operate as was described, above, in connection with FIG. 2. If the "gray" state supervisory function 42 trips, then the simulation stops at that point, because should the circuit breaker 2 trip there is no need to simulate additional half-cycles.

In this example, half-cycles with continuous hardware errors are relatively sparse (e.g., about 30 bad half-cycles out of 72,000 corresponds to an "availability" of about 0.99949), and the error criteria are not met. Hence, the "gray" state accumulator does not exceed the trip threshold and the circuit breaker 2 does not trip in response to "gray" state protection.

EXAMPLE 4

Figure 4A:
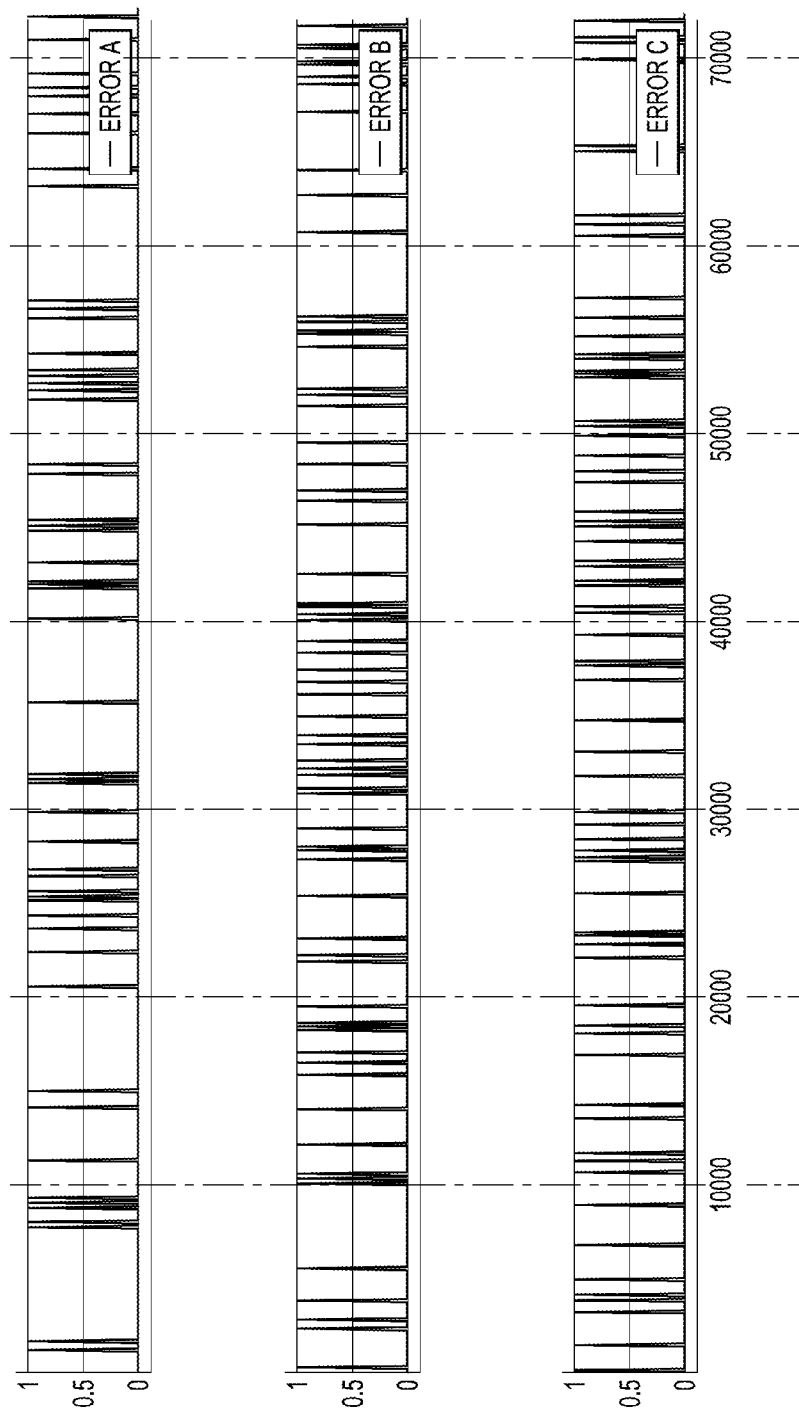
FIGS. 4A-4B form a plot of a "gray" state example with increased occurrences of continuous hardware self-test errors with respect to FIGS. 3A-3B in accordance with another embodiment of the disclosed concept.
Figure 4B:
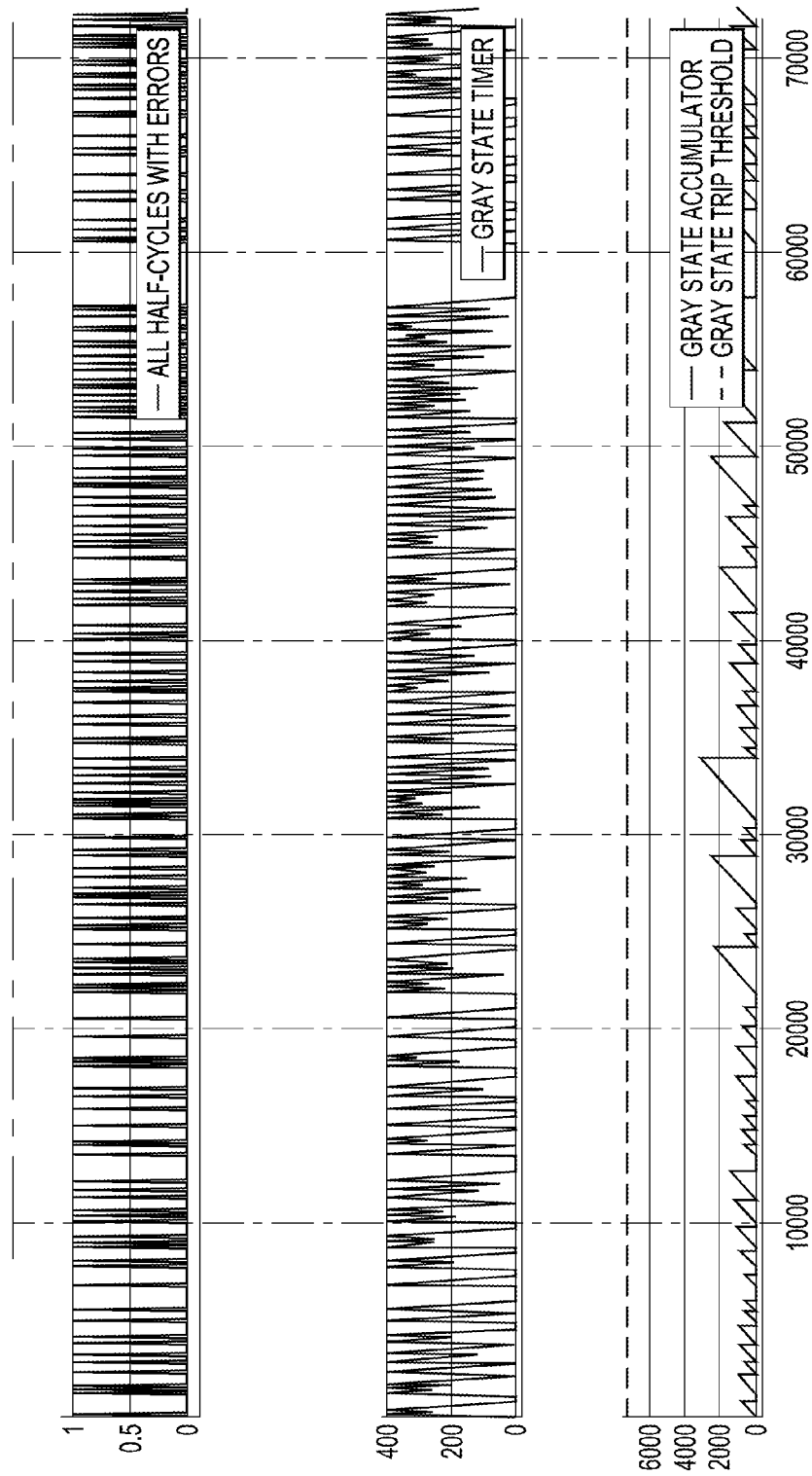

In the example shown in FIGS. 4A-4B, the rate of half-cycles with continuous hardware self-test errors has increased (e.g., about 200 bad half-cycles out of 72,000 corresponds to an "availability" of about 0.9971). In this example, the specific error criteria are not met and, thus, the circuit breaker 2 does not trip in response to "gray" state protection.

EXAMPLE 5

Figure 5A:
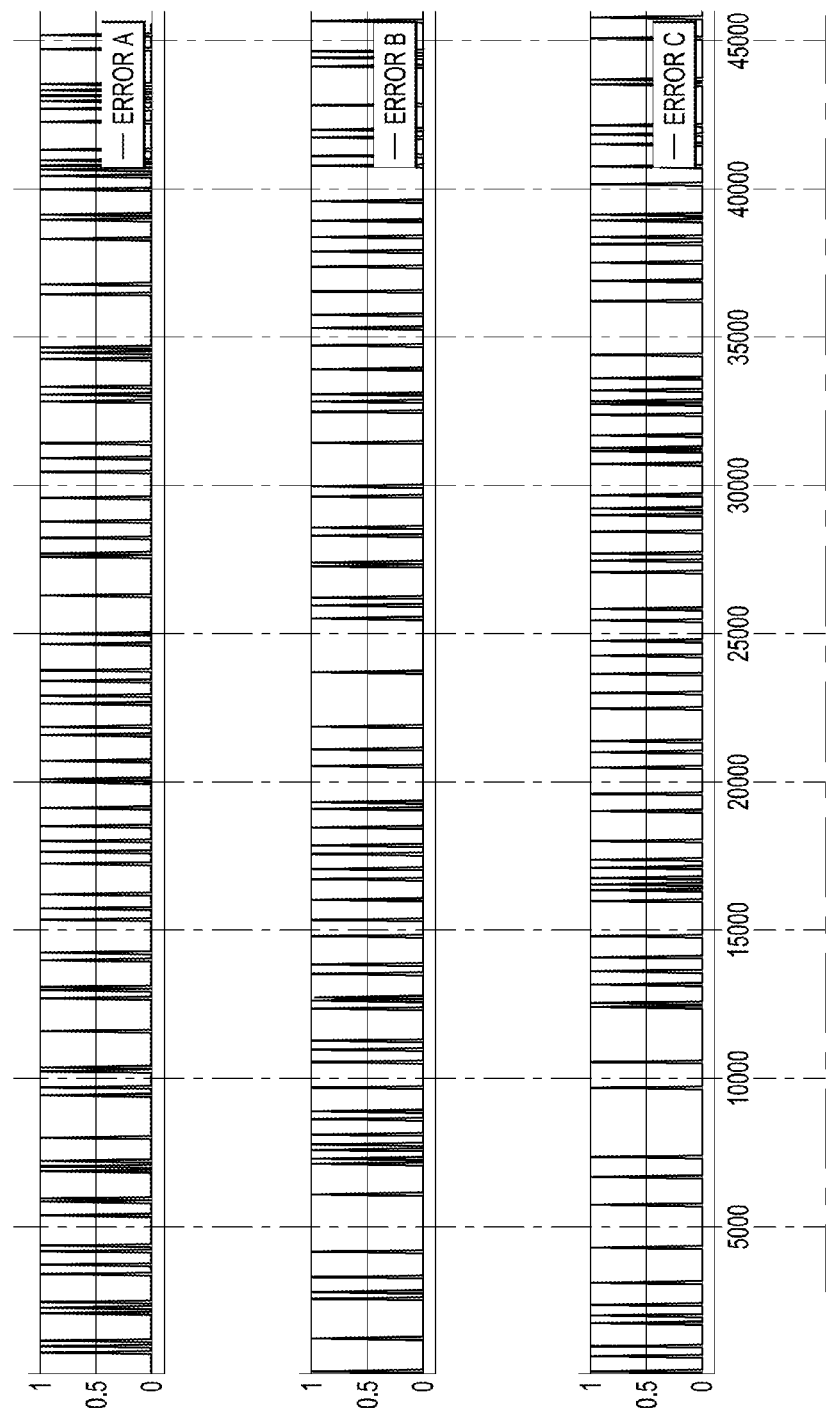
FIGS. 5A-5B form a plot of a "gray" state example with increased occurrences of continuous hardware self-test errors with respect to FIGS. 4A-4B in which a circuit interrupter trips in response to a series of continuous hardware errors in accordance with another embodiment of the disclosed concept.
Figure 5B:
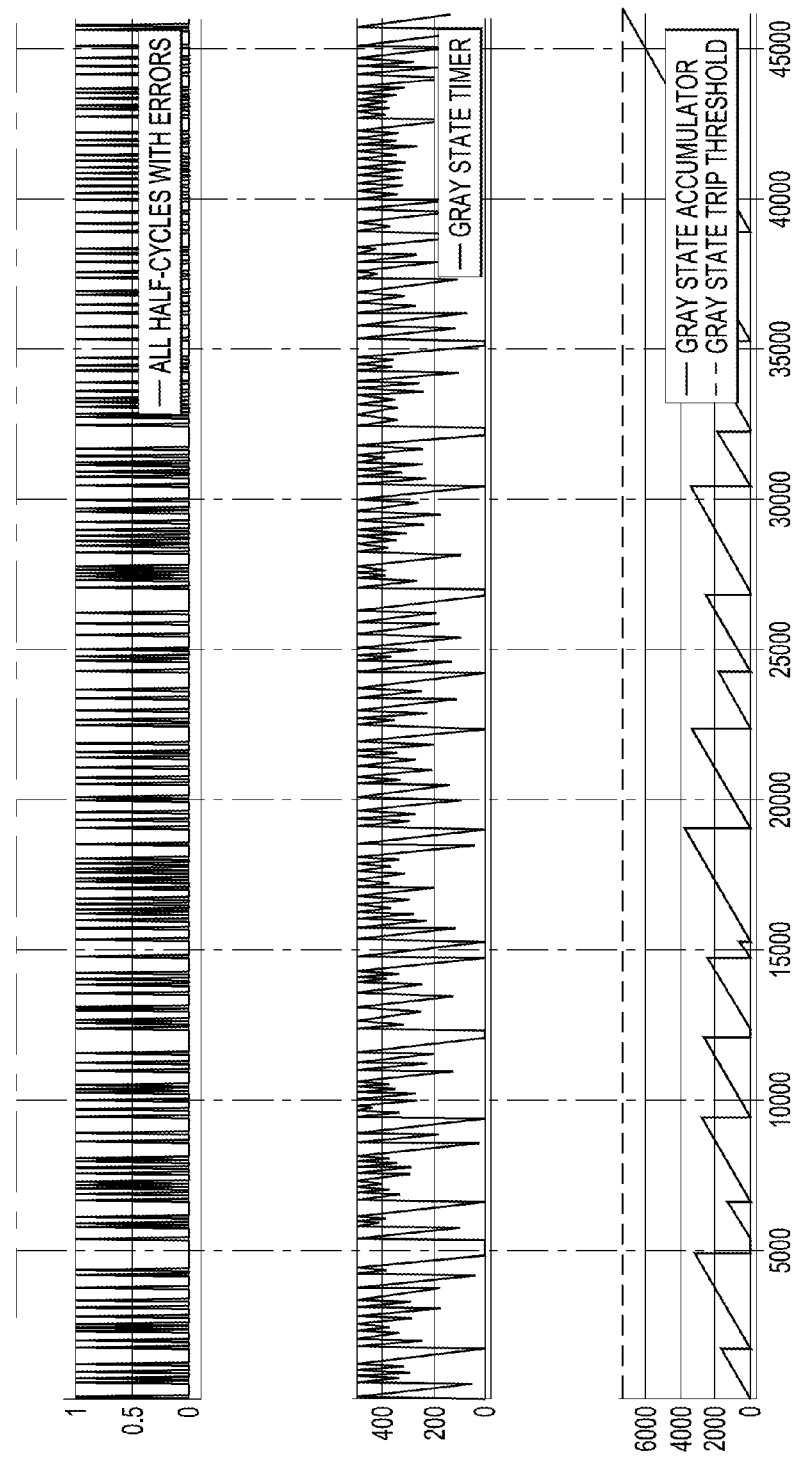

In the example shown in FIGS. 5A-5B, the rate of half-cycles with continuous hardware self-test errors has increased yet again (e.g., about 270 bad half-cycles out of 45,972 corresponds to an "availability" of about 0.99415). Because a ten-second span occurs during which the "gray" state timer never reaches zero, the circuit breaker 2 trips after about six minutes and 23.1 seconds into the simulation. So, in this case, the "gray" state function 42 determines that the rate of continuous hardware self-test errors was unacceptably high over the specified time window, and trips the circuit breaker 2. FIG. 5A represents a sample size of about 46,000 half-cycles, while FIGS. 3A and 4A represent a sample size of 72,000 half-cycles.

EXAMPLE 6

It is useful to consider the benefits produced by the example "gray" state function 42. Some possible scenarios involving permutations of arc faults and hardware errors are discussed followed by a description of how an AFCI with such a "gray" state supervisory monitoring function would respond in each case. The intent is to consider whether there is a "worst case" scenario and, if so, to identify it for further refinement.

If an arc fault occurs while the example circuit interrupter hardware circuits 16,18,20,22,24,26,28,30,32 are functioning correctly and the protective functions 38 are 100% available (e.g., the circuit breaker 2 is in a "white" state), then the circuit breaker 2 will trip in response to the arc fault.

If an uninterrupted hardware error condition occurs and the protective functions 38 are 0% available (e.g., the circuit breaker 2 is in a "black" state), then the circuit breaker 2 will trip relatively quickly due to the repetitive test functions 40.

If intermittent hardware errors occur which are not frequent enough for the circuit breaker 2 to trip due to one of the repetitive test functions 40 (e.g., the circuit breaker 2 is in a "gray" state) and are also not concurrent with an arc fault, then the circuit breaker 2 will trip on "gray" state protection, assuming that the error rate is high enough to meet the "gray" state trip criteria.

If intermittent hardware errors occur which are not frequent enough for the circuit breaker 2 to trip due to one of the repetitive test functions 40 (e.g., the circuit breaker 2 is in a "gray" state, which is nearly but not quite a "white" state) concurrently with an arc fault, then this is believed to be the worst case scenario, albeit a relatively highly improbable one.

EXAMPLE 7

Further to Example 6, the disclosed "gray" state function 42 ensures that the average rate of continuous hardware self-test failures is relatively low (e.g., without limitation, less than 1 per 500 half-cycles or 4.17 seconds, in Example 1; hence, it is unlikely that a hardware self-test failure will occur during an arc fault. However, the relatively highly improbable worst-case scenario is still considered. As was discussed, the worst-case scenario is believed to be one in which a continuous hardware self-test fails during an arc fault, and causes a number of the protective functions 38 to reset.

Reasonably assuming that most series arc faults are continuous, and that the average trip time for a series arc fault is about 200 mS (or 24 half-cycles), for a circuit breaker with "gray" state protection with the same parameters as Example 1 (e.g., A=500; B=7200), if the circuit breaker 2 has been turned on for a relatively long time and is not tripped, then it must be experiencing an average error rate of less than one continuous self-test failure per 500 half-cycles. In other words, if the error rate was greater, then the circuit breaker 2 would have already tripped. Reasonably assuming that an average arc fault event occurs (and that the circuit breaker hardware self-test error rate remains the same during the arc fault), the chances that a hardware error would occur after the arc fault begins, but before the circuit breaker 2 trips, is equal to or less than 24/500 or 4.8%. Hence, for such a circuit breaker, even in the worst case scenario, there is more than a 95% confidence that the circuit breaker 2 should detect a typical arc fault.

EXAMPLE 8

Further to Example 7, if an actual arc fault occurs in a protected branch circuit and, in addition, a continuous hardware self-test failure occurs right before the circuit breaker 2 is about to trip, then the corresponding arc fault protective function 38 would be reset as a result of a failed continuous hardware self-test, because the data that the arc fault protective function employs is considered suspect. At this point, the actual arc fault has persisted for about 24 half-cycles. It could either extinguish (in which case, the arc fault protection is not needed), but a more likely scenario is that the arc fault will persist. If so, then it is improbable that a second continuous hardware failure would occur before the arc fault protective function detects the arc fault and trips the circuit breaker 2 after another 24 half-cycles of arcing. Even with an intervening continuous hardware self-test failure, the AFCI circuit breaker 2 would almost certainly trip within 48 half-cycles (or 0.4 seconds) or less of arcing.

From UL 1699 table 40.1, an AFCI circuit breaker is required to trip in under 0.4 seconds for a 10 A series arc. Based on this analysis, the AFCI circuit breaker 2 in Example 7 can tolerate a single continuous hardware self-test failure that occurs during an arc fault and still likely meet the requirements of UL 1699, as long as the load current is 10 A or less. Since most of the circuits in the installed AFCI base are probably loaded to less than 10 A, it seems like an AFCI circuit breaker with appropriate "gray" state protection can provide UL 1699-compliant protection, even in cases when the AFCI-related hardware circuits are marginal.

Examples 6-8 show that the "gray" state protection should effectively eliminate cases where a particular circuit breaker fails to trip in response to an arc fault because of a hardware error.

EXAMPLE 9

This example discusses other "gray" state functions with improved diagnostics. When the example AFCI circuit breaker 2 trips, it can store a "cause-of-trip" value in non-volatile memory (M) 64 of the microcontroller 34. If such a device is returned to the manufacturer from a customer, and the "cause-of-trip" value stored in the non-volatile memory 64 indicates that the circuit breaker 2 tripped in response to the "gray" state function 42, and since the "gray" state function 42 can trip in response to errors from a number of sources (e.g., the number of repetitive test functions 40 corresponding to the various hardware circuits 16,18,20,22,24,26,28,30,32), then there is a need to provide further information about why the "gray" state function 42 tripped.

Relatively more sophisticated versions of the "gray" state supervisory monitoring functions 42',42" are disclosed in connection with respective FIGS. 6A-6B and 7A-7C. The function 42" of FIGS. 7A-7C allows the dominant error contributor to a "gray" state fault to be identified and stored in the non-volatile memory 64.

EXAMPLE 10

A non-limiting example of a continuous hardware self-test involves a hardware circuit (e.g., 20) in an AFCI, such as the example circuit breaker 2 of FIG. 1, the output of which should only range from, for example and without limitation, 1 V to 2 V. The microcontroller 34 continuously checks the output of the hardware circuit and compares it to a nominal operating range. If the microcontroller 34 reads the hardware circuit output voltage as 0 V, then it knows that something is not operating correctly (e.g., it could be that the hardware circuit is operating improperly, or that an A/D converter (e.g., 66) of the microcontroller 34 is operating improperly, or perhaps another failure mode). The microcontroller 34 can then take some corrective action (e.g., without limitation, ignore the condition; disable the number of corresponding protective functions 38 that rely on proper operation of the hardware circuit; or cause the circuit breaker 2 to trip).

Examples 11-14, below, disclose examples of continuous hardware tests, such as repetitive test functions, within the context of the example electronic trip circuit 14 of the example circuit breaker 2 of FIG. 1.

EXAMPLE 11

A continuous hardware test is provided for the high frequency noise detection circuit 24. The output of this circuit 24 is read continuously by an A/D converter 68 of the microcontroller 34. In this example, the result of the A/D conversion should be between 0.2*Vcc and 0.8*Vcc. If it is not, then the output of the circuit 24 is out-of-tolerance and there is a some kind of hardware error (e.g., in the high frequency detection circuit 24; the A/D converter 68; a multiplexer (not shown); another failure mode).

Usually, small, low-cost microprocessors have only a single A/D converter, which is connected to multiple analog inputs or "channels" by an analog multiplexer. There is a possibility that the analog multiplexer could be broken and connect the A/D converter to the wrong analog input pin. The disclosed hardware self-tests seek to catch such a hardware failure.

EXAMPLE 12

A continuous hardware test is provided for checking the internal clock frequency of the internal clock 30 of the microcontroller 34. The line-to-neutral voltage sensing and zero crossing (or polarity change) detector 16 outputs to a digital input (Din) 70 of the microcontroller 34. In this example, the nominal frequency of the alternating current (AC) voltage of the example power source 6 is 60 Hz and the microcontroller internal clock frequency is 12 MHz. Nominally, there are 100,000 internal clock cycles per half-cycle of the power source voltage. If the microcontroller 34 counts internal clock cycles between each consecutive voltage zero crossing (or polarity change), and then discovers there are, for example, less than 80,000 or more than 120,000 clock cycles, then either the internal clock frequency is out of tolerance or the power source frequency has drifted. In this example, the pass/fail criteria involves the ratio between two quantities, although the test does not determine which quantity is out of tolerance, or whether both quantities are out of tolerance.

In the United States, utility frequency is usually tightly maintained around 60 Hz. If it is assumed that the utility power source frequency is always good, then any error is the result of the variation of the internal microcontroller clock 30. However, if the AC voltage source 6 is from a stand-alone generator, then this may result in "false" hardware error detections if the generator frequency varies substantially from 60 Hz.

EXAMPLE 13

Somewhat similar to Example 12, another continuous hardware test is provided for checking the internal clock frequency of the microcontroller 34. Here, the resistor-capacitor (R-C) circuit 32 is electrically connected between Vcc, which is output by power supply 18, and ground, and the midpoint voltage of the RC circuit 32 is periodically read via an A/D converter 72 of the microcontroller 34. After the midpoint voltage is read, the programmable input pin function associated with the A/D converter 72 is temporarily changed to a digital output, which drives the capacitor voltage to zero. Then, the input pin function is changed back to be associated with the A/D converter 72 (e.g., to a high impedance) input. The voltage reading of the midpoint of the R-C circuit 32 obtained by the A/D converter 72 is compared to an expected range of values. If the reading is outside of the expected range of values, then either the timing of the microcontroller 34 is not correct, the time constant of the R-C circuit 32 is not correct, the A/D converter 72 is malfunctioning, or another failure mode has occurred. This microcontroller internal clock frequency check is better than that of Example 12 because it is not affected by variations in the AC source frequency.

EXAMPLE 14

Similar to Example 10, a continuous hardware test is provided for checking the voltage Vcc of the power supply 18 and the direct current voltage reference 20 that also provides a reference voltage for the A/D converter 66, which is typical for a relatively low-cost microcontroller, such as 34. The direct current voltage reference 20 includes a resistor and a zener diode (as shown in FIG. 1) or a suitable precision shunt regulator (not shown). The series combination of the resistor and zener diode is electrically connected between Vcc and ground. The midpoint of this circuit is read periodically by the A/D converter 66 of the microcontroller 34 and the digital result is compared with an expected range of results. If the readings fall outside of the expected range of results, then there is some kind of hardware problem. This problem may be associated with the A/D converter 66, the value of the power supply voltage Vcc, or the value of the zener diode (or precision shunt regulator).

EXAMPLE 15

Figure 6A:
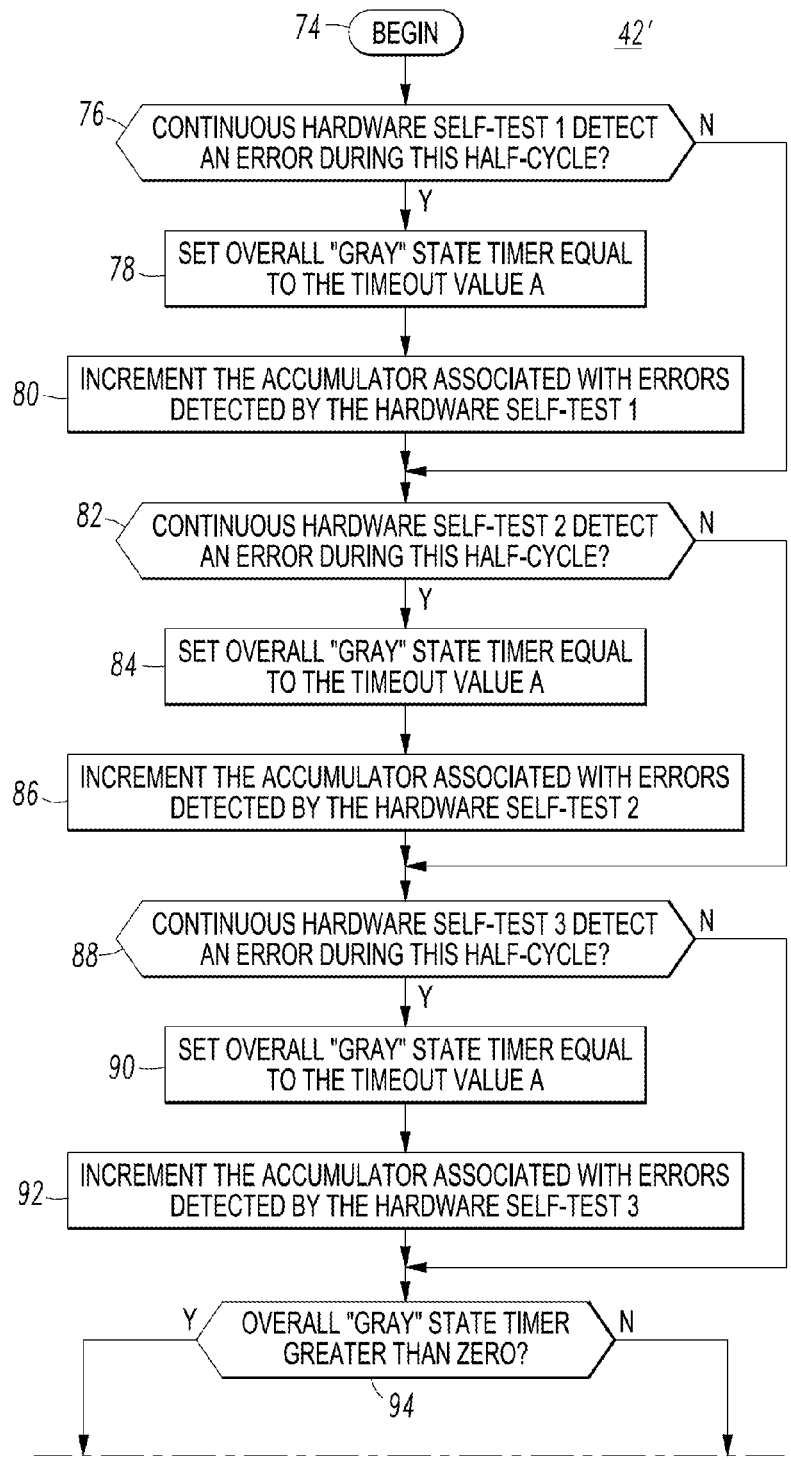
FIGS. 6A-6B and 7A-7C are flowcharts of "gray" state supervisory functions of the circuit interrupter of FIG. 1.
Figure 6B:
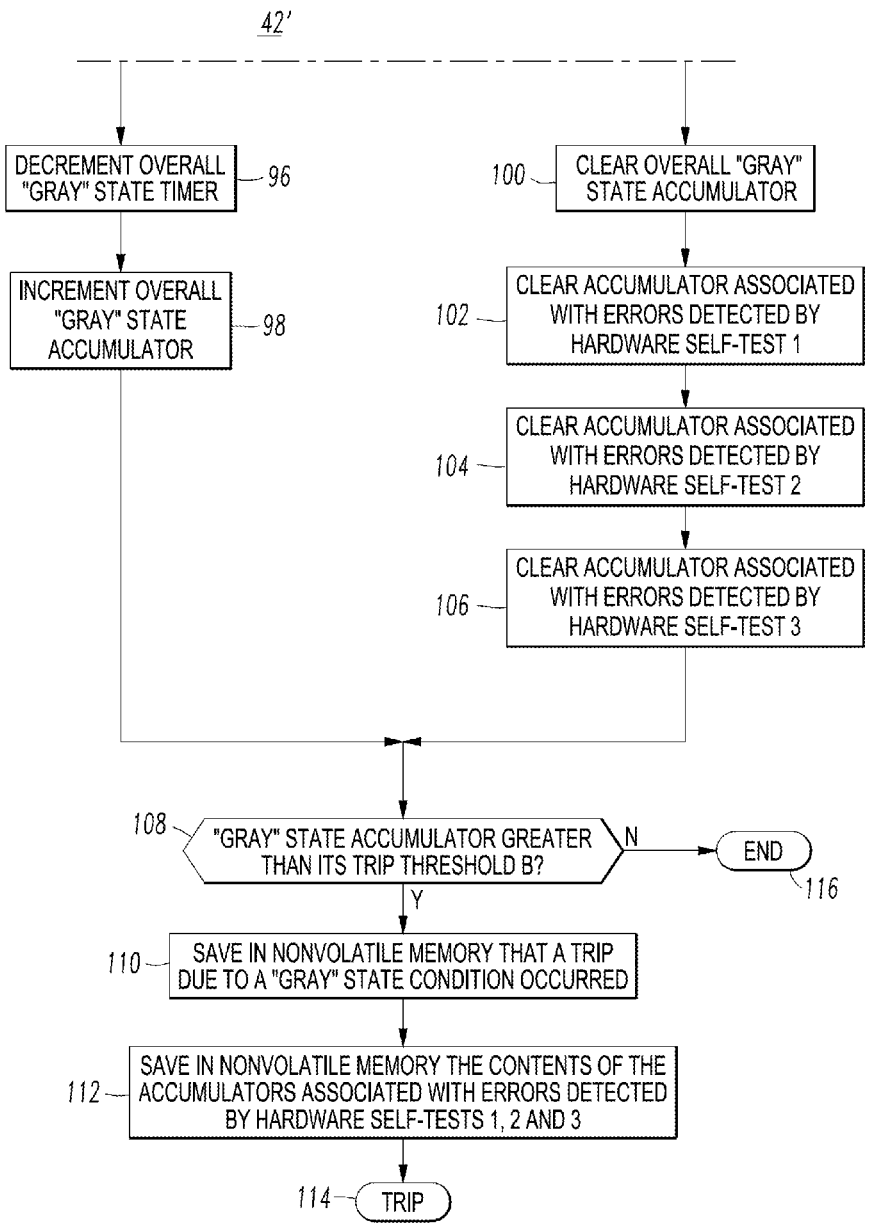

FIGS. 6A-6B show the "gray" state function 42' in which, for example, there are three continuous hardware tests, each of which can detect a particular hardware failure mode. This supervisory function 42' is structured to cause the trip circuit 14 of FIG. 1 to cooperate with the operating mechanism 12 to trip open the separable contacts 10, and to store a corresponding cause-of-trip value in the non-volatile memory 64 responsive to tripping open the separable contacts 10.

The function 42' begins at 74 and is executed, for example and without limitation, once per half-cycle. At 76, it is determined if a first continuous hardware self-test detected that an error occurred during this half-cycle. If so, then at 78, an overall "gray" state timer is set equal to timeout value A. Next, at 80, an accumulator associated with errors detected by the first hardware self-test is incremented. After 80, or if no error was detected at 76, at 82, it is determined if a second continuous hardware self-test detected that an error occurred during this half-cycle. If so, then at 84, an overall "gray" state timer is set equal to timeout value A. Next, at 86, an accumulator associated with errors detected by the second hardware self-test is incremented. After 86, or if no error was detected at 82, at 88, it is determined if a third continuous hardware self-test detected that an error occurred during this half-cycle. If so, then at 90, an overall "gray" state timer is set equal to timeout value A. Next, at 92, an accumulator associated with errors detected by the third hardware self-test is incremented.

After 92, or if no error was detected at 88, at 94, it is determined if the overall "gray" state timer is greater than zero. If so, then, at 96, the overall "gray" state timer is decremented and, at 98, the overall "gray" state accumulator is incremented. Otherwise, if the overall "gray" state timer is not greater than zero at 94, then, at 100, the overall "gray" state accumulator is cleared, and the three accumulators associated with errors detected by the example first, second and third hardware self-tests are respectively cleared at 102, 104 and 106.

After 98 or 106, it is determined if the "gray" state accumulator is greater than its trip threshold B at 108. If so, then, at 110, a value is saved in the non-volatile memory 64 that a trip due to a "gray" state condition occurred. Then, at 112, the contents of the three example accumulators associated with errors detected by the three example hardware self-tests are saved in the non-volatile memory 64. Here, all of the "gray" state contributors (i.e., all of the three example hardware self-test error accumulators) are saved in order that the information is available later for debugging purposes. Finally, the function 42' causes the trip of the circuit breaker 2 at 114. On the other hand, if the "gray" state accumulator is not greater than its trip threshold B at 108, then the function 42' ends for the current half-cycle at 116.

EXAMPLE 16

Figure 7A:
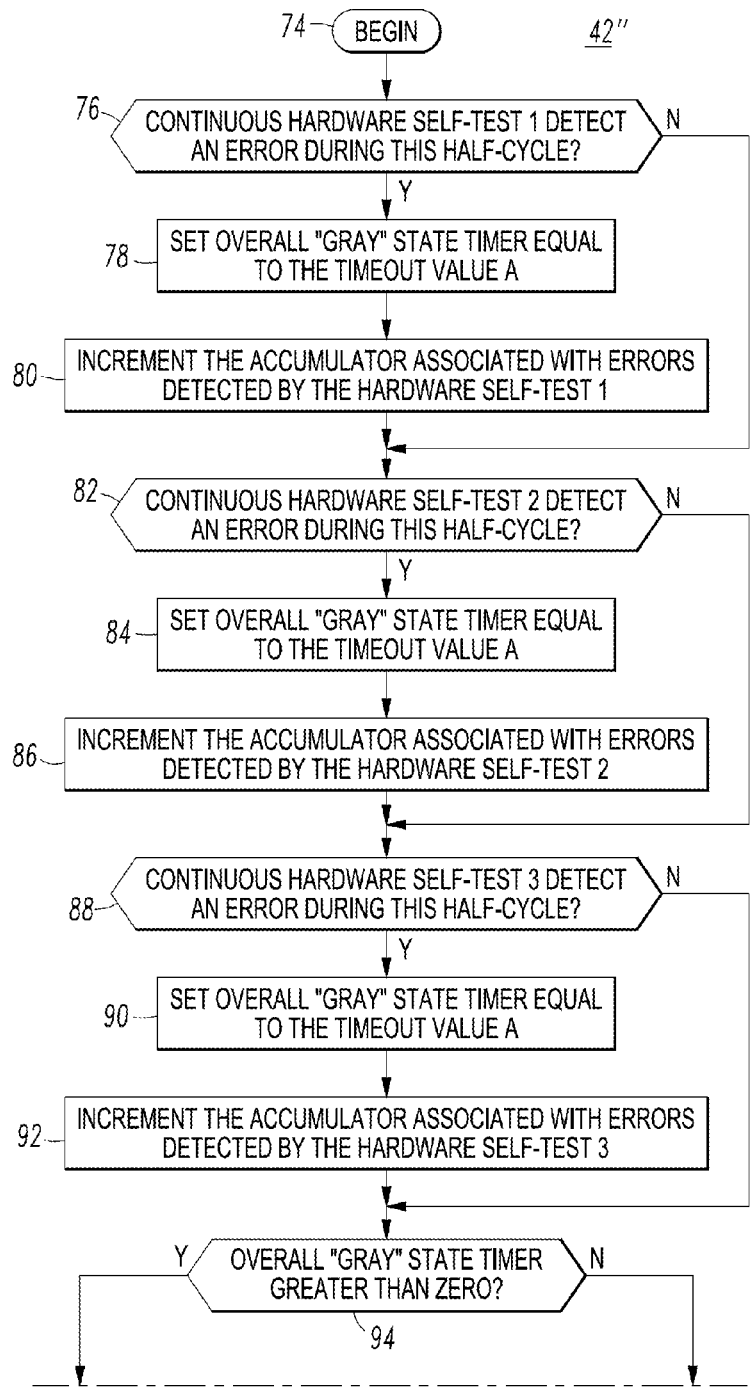
Figure 7B:
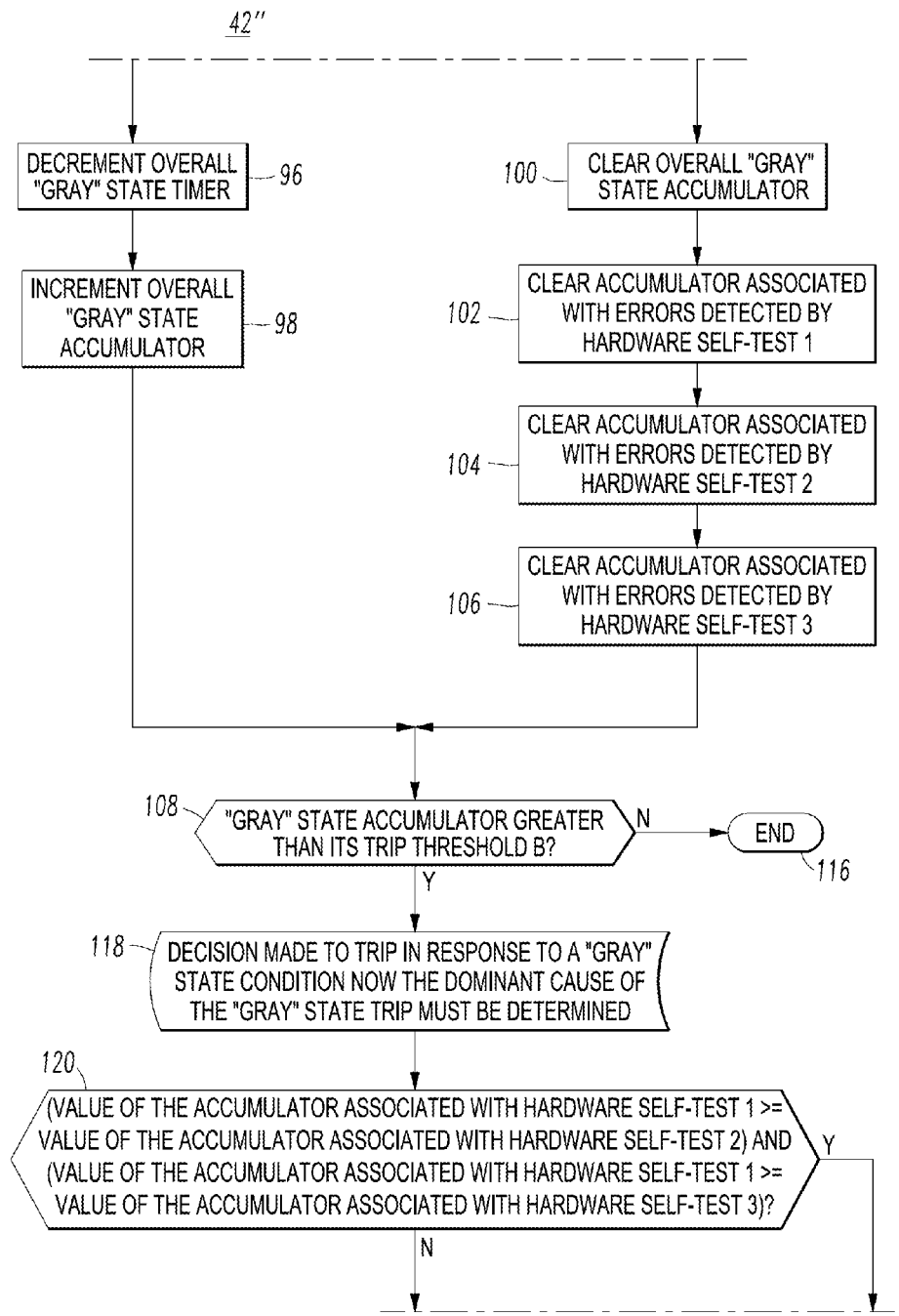
Figure 7C:
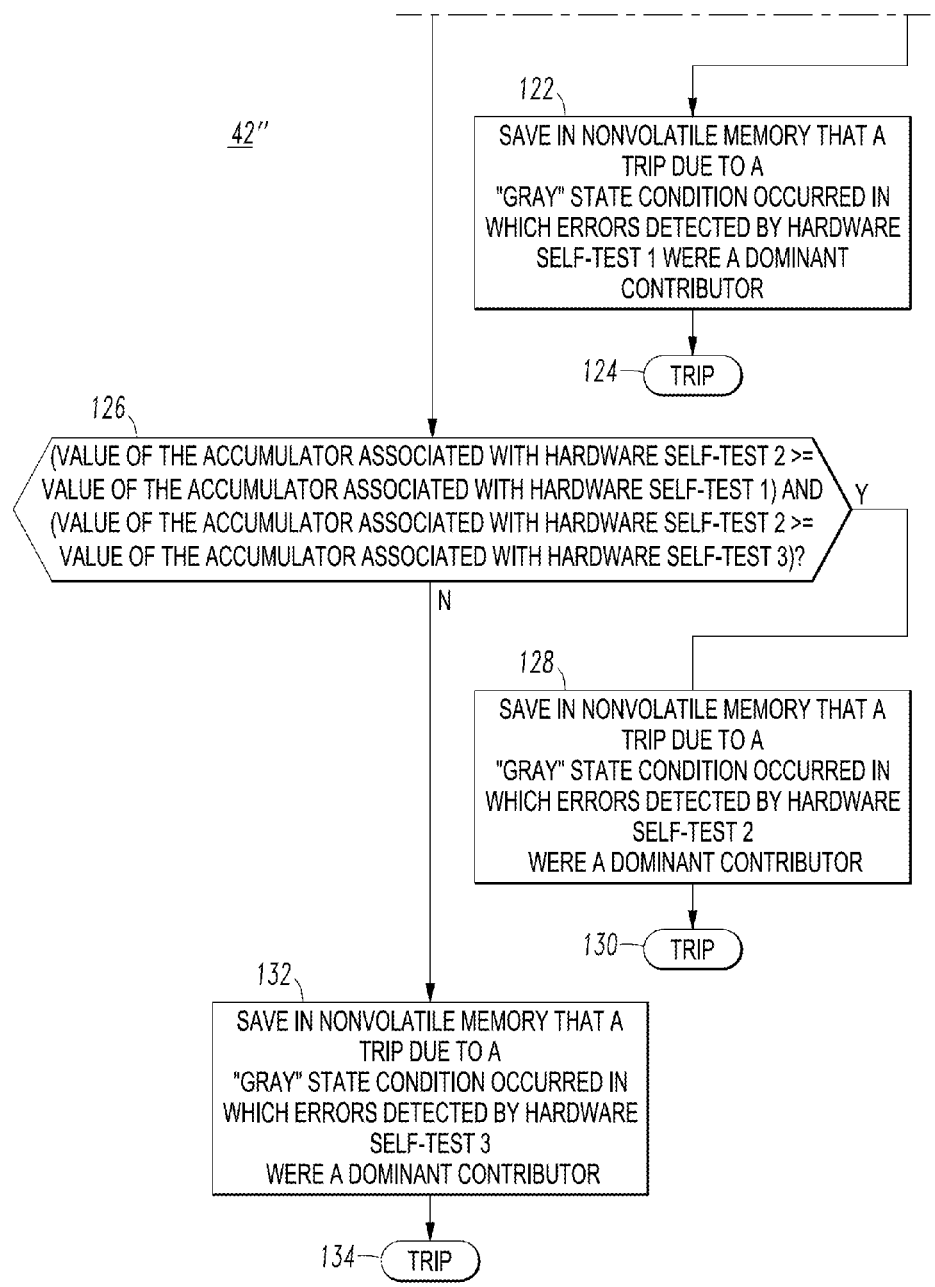

FIGS. 7A-7C show the "gray" state function 42" in which, for example, the dominant error contributor of a plurality of repetitive test functions is determined and a corresponding value is stored with the corresponding cause-of-trip value in the non-volatile memory 64 responsive to tripping open the separable contacts 10. The function 42" of FIGS. 7A-7C is similar to the function 42' of FIGS. 6A-6B and includes the same even steps 74 through and including 108 and 116. In FIGS. 7A-7C, a "gray" state trip occurs in which a number of errors were detected by the three example hardware self-tests.

In this example, perhaps there is a limited amount of non-volatile memory space and the intent is to minimize the data stored per trip, or perhaps there is inadequate time to store multiple bytes of data before the circuit breaker must trip, or perhaps the intent is not to store every last bit of error information relating to a "gray" state trip. In any case, the example function 42" only identifies a single dominant contributor, but not necessarily a comprehensive set of "gray" state trip cause information. After a decision has been made to trip at 108 in response to a "gray" state condition, the dominant cause of the "gray" state trip is identified beginning at 118.

At 120, it is determined if the value of the accumulator associated with the first hardware self-test is greater than or equal to the value of the accumulator associated with the second hardware self-test, and if the value of the accumulator associated with first hardware self-test is greater than or equal to the value of the accumulator associated with third hardware self-test. If so, then, at 122, a value is saved in the non-volatile memory 64 to indicate that a trip due to a "gray" state condition occurred, in which errors detected by the first hardware self-test were a dominant contributor. Then, at 124, a trip of the circuit breaker 2 is initiated.

On the other hand, if the test at 120 was false, then, at 126, it is determined if the value of the accumulator associated with the second hardware self-test is greater than or equal to the value of the accumulator associated with the first hardware self-test, and if the value of the accumulator associated with second hardware self-test is greater than or equal to the value of the accumulator associated with third hardware self-test. If so, then, at 128, a value is saved in the non-volatile memory 64 to indicate that a trip due to a "gray" state condition occurred, in which errors detected by the second hardware self-test were a dominant contributor. Then, at 130, a trip of the circuit breaker 2 is initiated.

On the other hand, if the test at 126 was false, then, at 132, a value is saved in the non-volatile memory 64 to indicate that a trip due to a "gray" state condition occurred, in which errors detected by the third hardware self-test were a dominant contributor. Then, at 134, a trip of the circuit breaker 2 is initiated.

The disclosed concept adds another layer of "operational certainty" to circuit interrupters in order to ensure product integrity and consumer safety.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter for a power circuit, said circuit interrupter comprising:
   separable contacts;
   an operating mechanism structured to open and close said separable contacts; and
   a trip circuit cooperating with said operating mechanism to trip open said separable contacts, said trip circuit comprising a number of hardware circuits including a processor having a number of routines structured to provide:
   a number of protective functions structured to detect a number of faults of said power circuit,
   a number of repetitive test functions thr said number of hardware circuits, and
   a supervisory fimetion cooperating with said number of repetitive test functions, said supervisory function being structured to prevent availability of protection by said number of protective functions from falling below a predetermined threshold as a result of a plurality of intermittent error conditions of said number of hardware circuits,
   wherein said supervisory function is executed once per each of a plurality of half-cycles of a line-to-neutral voltage of said power circuit, and is structured to determine if any one of the number of repetitive test functions detects an error condition during a current one of the half-cycles, set a timer equal to a predetermined timeout value, determine if the timer is greater than zero, decrement the timer and increment an accumulator, determine if the accumulator is greater than a predetermined threshold value and responsively cause said trip circuit to cooperate with said operating mechanism to trip open said separable contacts.

2. A circuit interrupter for a power circuit, said circuit interrupter comprising:
   separable contacts;
   an operating mechanism structured to open and close said separable contacts; and
   a trip circuit cooperating with said operating mechanism to trip open said separable contacts, said trip circuit comprising a number of hardware circuits including a processor having a number of routines structured to provide:
   a number of protective functions structured to detect a number of faults of said power circuit,
   a number of repetitive test functions fir said number of hardware circuits, and
   a supervisory function cooperating with said number of repetitive test functions, said supervisory function being structured to prevent availability of protection by said number of protective functions from falling below a predetermined threshold as a result of a plurality of intermittent error conditions of said number of hardware circuits,
wherein each of said number of repetitive test functions is structured to detect an out-of-tolerance condition of a corresponding one of said number of hardware circuits and responsively increment a corresponding error accumulator, and cause said trip circuit to trip open said separable contacts if the corresponding error accumulator exceeds a predetermined value, and if the out-of-tolerance condition is no longer detected to reset said corresponding error accumulator.

3. The circuit interrupter of Claim 1 wherein said circuit interrupter is a ground fault circuit interrupter.

4. The circuit interrupter of claim 1 wherein said circuit interrupter is an arc fault circuit interrupter.

5. The circuit interrupter of claim 4 wherein said number of hardware circuits further include a hardware circuit having an output with a voltage which normally ranges from a first voltage to a second larger voltage; and wherein said number of repetitive test functions is structured to determine if the voltage of the output of said hardware circuit is less than the first voltage or greater than the second larger voltage.

6. The circuit interrupter of claim 4 wherein one of the number of protective functions detects an arc fault as said number of faults; and wherein one of the number of repetitive test functions detects an error condition during said arc fault and resets said one of the number of protective functions.

7. The circuit interrupter of claim 6 wherein said number of protective functions include an arc fault trip function structured to detect a 10 A series arc fault and cause said operating mechanism to trip open said separable contacts in less than about 0.2 seconds when the number of repetitive test functions do not detect an error condition; and
wherein said arc fault trip function is structured to detect the 10 A series arc fault and cause said operating mechanism to trip open said separable contacts in less than 0.4 seconds when the number of repetitive test functions do detect the error condition.

8. The circuit interrupter of claim 6 wherein said number of protective functions include an arc fault trip function structured to detect a 9 A series arc fault and cause said operating mechanism to trip open said separable contacts in less than 0.4 seconds.

9. The circuit interrupter of claim 1 wherein said number of hardware circuits further include a non-volatile memory; and wherein said number of routines are further structured to store a cause-of-trip value in said non-volatile memory responsive to tripping open said separable contacts.

10. The circuit interrupter of claim 9 wherein said supervisory function is further structured to store a corresponding cause-of-trip value in said non-volatile memory responsive to tripping open said separable contacts.

11. The circuit interrupter of claim 10 wherein said number of repetitive test functions are a plurality of repetitive test functions; and wherein said supervisory function is further structured to determine a dominant error contributor of the plurality of repetitive test functions and store a corresponding value with said corresponding cause-of-trip value in said non-volatile memory responsive to tripping open said separable contacts.

12. The circuit interrupter of claim 11 wherein each of the plurality of repetitive test functions detects a different count of error conditions; and wherein the dominant error contributor is one of the plurality of repetitive test functions having a maximum count of the different count of error conditions for each of said plurality of repetitive test functions.

13. The circuit interrupter of claim 1 wherein said number of hardware circuits further include a high frequency noise detection circuit having an output with a voltage which normally ranges from a first voltage to a second larger voltage; and wherein said number of repetitive test functions is structured to determine if the voltage of the output of said high frequency noise detection circuit is less than the first voltage or greater than the second larger voltage.

14. The circuit interrupter of claim 1 wherein said processor comprises a clock having a frequency; wherein said number of hardware circuits further include a line-to-neutral voltage zero crossing detector having an output which is input by said processor; wherein a ratio of cycles of said clock divided by a plurality of half-cycles of the line-to-neutral voltage of said power circuit is a first predetermined. value; and wherein said number of repetitive test functions is structured to determine if said ratio is less than a second predetermined value or greater than a larger third predetermined value.

15. The circuit interrupter of claim 1 wherein said processor comprises a clock having a frequency and a programmable input/output; wherein said number of hardware circuits further include a resistor-capacitor circuit having a series combination of a resistor and a capacitor electrically connected between a first node having a direct current voltage and a second ground node; wherein said processor further comprises an analog-to-digital converter structured to digitally convert a voltage between said capacitor and said resistor from said programmable input/output; and wherein said number of repetitive test functions is structured to provide three steps including: set said programmable input/output as an input, read the digitally converted voltage and determine if said digitally converted voltage is less than a first predetermined value or greater than a larger second predetermined value, set said programmable input/output as an output and zero said voltage, and delay a predetermined period of time, and repeat said three steps.

16. The circuit interrupter of claim 1 wherein said processor comprises an analog-to-digital converter; wherein a portion of one of said number of hardware circuits is a power supply providing a reference voltage to said analog-to-digital converter; and
wherein said number of repetitive test functions is structured to determine if a digitally converted voltage from said analog-to-digital converter is less than a first predetermined value or greater than a second larger value.

17. A circuit interrupter for a power circuit, said circuit interupter comprising:
separable contacts:
an operating mechanism structured to open and close said separable contacts; and
a trip circuit cooperatig with said operating mechanism to trip open said separable contacts, said trip circuit a number of hardware circuit including a processor having a number of routines structured to provide:
a number of protective functions structured to decect a number of faults of said power circuit,
a number of reptitive test functions for said number of hardware circuits, and
a supervisory function cooperating with said number of repetitive test function, said supervisory function being structured to prevent availability of protection by said number of protective functions from falling below a predetermined threshold as a result of a plurality of intermitted erro condition of said number of hardware circuits,
wherein said number of hardware circuits further include a non-volatile memory; wherein said supervisory function is structured to execute once for each of a plurality of half cycles of a line to neutral voltage of said power circuit, determine if one of the number of repetitive test functions detected that an error condition occurred during a current one of the half-cycles, set a timer equal to a corresponding timeout value, increment an accumulator associated with a count of error conditions detected by said one of the number of repetitive test functions, determine if the timer is greater than zero, decrement the timer and increment the accumulator associated with the count of error conditions detected by said one of the number of repetitive test functions, and determine if the accumulator associated with the count of error conditions detected by said one of the number of repetitive test functions is greater than a corresponding trip threshold, and save, for each of the number of repetitive test functions, the accumulator associated with the count of error conditions detected by said one of the number of repetitive test functions in the non-volatile memory before causing said operating mechanism to trip open said separable contacts.

18. An electronic trip unit for a circuit breaker for a power circuit, said circuit breaker including an operating mechanism and separable contacts, said electronic trip unit comprising:

a trip circuit structured to cooperate with said operating mechanism to trip open said separable contacts, said trip circuit comprising a number of hardware circuits including a processor having a nuMber of routines structured to provide:
   a number of protective flinctions structured to detect a number of faults of said power circuit,
   a number of repetitive test functions for said number of hardware circuits, and
   a supervisory function cooperating with said number of repetitive test functions, said supervisory function being structured to prevent availability of protection by said number of protective functions from falling below a predetermined threshold as a result of a plurality of intermittent error conditions of said number of hardware circuits,
wherein said supervisory function is executed once per each of a plurality of half-cycles of a line-to-neutral voltage of said power circuit, and is structured to determine if any one of the number of repetitive test functions detects an error condition during a current one of the half-cycles, set a timer equal to a predetermined timeout value, determine if the tinier is greater than zero, decrement the timer and increment an accumulator, and determine if the accumulator is greater than a predetermined threshold value and responsively cause said trip circuit to cooperate with said operating mechanism to trip open said separable contacts.

\* \* \* \* \*